United States Patent
Kwok et al.

(10) Patent No.: US 7,294,676 B2
(45) Date of Patent: Nov. 13, 2007

(54) STYRENIC RESIN COMPOSITION AND ARTICLES PRODUCED THEREFROM

(75) Inventors: John Chi Hee Kwok, Moon Township, PA (US); Richard Albert Cooper, Virginia Beach, VA (US); Steven Michael Krupinski, Pittsburgh, PA (US)

(73) Assignee: NOVA Chemicals Inc., Moon Township, PA (US)

( * ) Notice: Subject to any disclaimer, the term of this patent is extended or adjusted under 35 U.S.C. 154(b) by 300 days.

(21) Appl. No.: 10/807,621

(22) Filed: Mar. 24, 2004

(65) Prior Publication Data

US 2005/0020756 A1     Jan. 27, 2005

Related U.S. Application Data

(60) Provisional application No. 60/489,773, filed on Jul. 24, 2003.

(51) Int. Cl.
| | |
|---|---|
| *C08L 35/00* | (2006.01) |
| *C08L 9/00* | (2006.01) |
| *C08L 23/00* | (2006.01) |
| *C08L 23/04* | (2006.01) |
| *C08L 33/18* | (2006.01) |
| *C08L 25/04* | (2006.01) |

(52) U.S. Cl. .................. 525/207; 525/214; 525/232; 525/238; 525/240; 525/241

(58) Field of Classification Search .............. 525/207, 525/214, 232, 238, 240, 241
See application file for complete search history.

(56) References Cited

U.S. PATENT DOCUMENTS

| | | | |
|---|---|---|---|
| 2,769,804 A | 11/1956 | Hanson | |
| 2,971,939 A | 2/1961 | Baer | |
| 3,336,267 A | 8/1967 | Zimmerman et al. | |
| 3,919,354 A | 11/1975 | Moore et al. | |
| 4,328,327 A | 5/1982 | Tanaka et al. | |
| 4,921,906 A | 5/1990 | Meyer et al. | |
| 4,987,170 A | 1/1991 | Ishida et al. | |
| 5,106,696 A | 4/1992 | Chundury et al. | |
| 5,145,924 A | 9/1992 | Shero et al. | |
| 5,219,628 A | 6/1993 | Hathaway et al. | |
| 5,543,461 A | 8/1996 | Nke-Aka et al. | |
| 5,852,124 A * | 12/1998 | Wang et al. ................ | 525/316 |
| 6,281,293 B1 | 8/2001 | Fujii | |
| 6,348,540 B1 * | 2/2002 | Sugioka et al. ............ | 524/577 |
| 6,930,150 B2 * | 8/2005 | Kim ........................... | 525/192 |

* cited by examiner

*Primary Examiner*—Nathan M. Nutter
(74) *Attorney, Agent, or Firm*—Gary F. Matz; Suzanne Kikel

(57) ABSTRACT

Styrenic resin composition comprising a rubber modified styrene maleic anhydride copolymer and polybutene. The resin is prepared by several methods including adding polybutene into the reactor, or adding polybutene to the syrup exiting the reactor and prior to entering the devolatilizer, or compounding polybutene into the polymer in an extruder after the polymer exits the devolatilizer. The polybutene ranges from 0.1 to 8% by weight and has a number average molecular weight from 900 to 2500. The rubber ranges from 4% to 20% by weight and has a particle size from 0.1 micron to 11 microns. The resin can be extruded into sheet and thermoformed into an article or can be coextruded to produce a laminated article, which may be a container for packaged foods that can be heated in microwave ovens and which container has improved toughness, elongation, and heat distortion resistance properties.

20 Claims, No Drawings

STYRENIC RESIN COMPOSITION AND ARTICLES PRODUCED THEREFROM

This application claims the benefit of U.S. Provisional Application No. 60/489,773 filed Jul. 24, 2003.

BACKGROUND OF THE INVENTION

1. Field of the Invention

The present invention relates to a styrenic resin composition. More particularly, the present invention relates to a styrenic resin composition comprising a rubber modified styrene maleic anhydride (SMA) copolymer and polybutene; to articles of manufacture, e.g. thermoformed containers suitable for packaged foods that are to be heated in microwave ovens, that are produced from the styrenic resin composition and having improved properties, e.g. toughness, elongation, and heat distortion resistance; and to related methods for producing the styrenic resin composition.

2. Background Art

It is known to copolymerize styrene and maleic anhydride. Such processes have been described at length in the literature, especially in Baer U.S. Pat. No. 2,971,939 and Hanson U.S. Pat. No. 2,769,804, and beneficially as a solution as disclosed in U.S. Pat. No. 3,336,267.

It is known in the art to modify styrene maleic anhydride (SMA) copolymers with rubber. Generally, these copolymers are referred to as "rubber modified styrene/maleic anhydride copolymers". It is known that the rubber component provides increased impact resistance and that the maleic anhydride component provides a high heat distortion temperature. An improved method for preparing styrene/maleic anhydride/diene rubber composition suitable for extrusion and molding and having a high heat distortion temperature and desired impact resistance is disclosed in Moore et al. U.S. Pat. No. 3,191,354 (The Dow Chemical Company), which was issued on Nov. 11, 1975.

Hathaway et al. U.S. Pat. No. 5,219,628 (The Dow Chemical Company), which was issued on Jun. 15, 1993, discloses a multi-layer container for use in the microwave cooking of food. The container comprises a substrate layer of thermoplastic polymer that is not suitable for contact with the food, and an inner layer comprised of a blend of styrene/maleic anhydride copolymer and a polymer selected from the group consisting of polystyrene, rubber modified polystyrene, polymethyl methacrylate, rubber modified polymethyl methacrylate, polypropylene, and mixtures thereof. This patent also teaches that rubber modified styrene/maleic anhydride copolymers may also be used, but are not preferred.

It is known to produce various shaped articles from foamed and unfoamed thermoplastic materials such as polystyrene sheet or impact modified polystyrene sheet (i.e. high impact polystyrene sheet) by thermoforming methods. Many such articles are containers used for packaged foods.

Chundury et al. U.S. Pat. No. 5,106,696 (assigned to Ferro Corporation), which was issued on Apr. 21, 1992 discloses and claims a thermoformable multi-layer structure for packaging materials and foods. A polymer composition for a first layer of the structure comprises: (A) 49% to 90% by weight of a polyolefin, i.e. polypropylene, polybutene; (B) 10% to 30% by weight of a copolymer of styrene and maleic anhydride; (C) 2% to 20% by weight of a compatilizing agent, i.e., a starblock, diblock or mixtures thereof of a copolymer of styrene and butadiene; (D) 0 to 5% by weight of a triblock copolymer of styrene and butadiene; and (E) 20% by weight of talc. The second layer of the structure is made of polypropylene.

It is known to improve the environmental stress crack resistance (ESCR) of high impact polystyrene (HIPS) and other impact modified styrenic polymers, such as acrylonitrile-butadiene-styrene plastic (ABS) and methyl methacrylate-butadiene-styrene plastics (MBS), with the addition of polybutene. U.S. Pat. No. 5,543,461 assigned to Novacor Chemicals (International) S.A. discloses a rubber modified graft thermoplastic composition comprising: 1) 99 to 96% by weight of a rubber modified thermoplastic comprising: (a) 4 to 15 weight % rubbery substrate, preferably polybutadiene, that is distributed throughout a matrix of the superstrate polymer in particles having a number average particle size from 6 to 12 microns and (b) 96 to 85% by weight of a superstrate polymer; and 2) 1 to 4% by weight of polybutene having a number average molecular weight from 900 to 2000. Claim 10 of this patent recites that the superstrate polymer may comprise 85% to 95% by weight of styrene and from 5% to 15% by weight of maleic anhydride. The ESCR of the impact modified styrenic polymers is attributed to the large particle size of the impact modifier, i.e. 6 to 12 microns and to the use of the low molecular weight polybutene. Such thermoplastics find a fairly significant market in housewares, which are subject to chemicals that tend to cause environmental stress cracking (ESC), such as cleaners and in some cases, fatty or oily food.

U.S. Pat. No. 5,543,461 discussed in the preceding paragraph discloses in the background section that the thermoplastic having the best ESCR is Chevron's HIPS grade 6755. This Chevron product contains 2 to 3 weight % of polybutene and has a dispersed rubbery phase with a volume average particle diameter between 4 and 4.5 microns. This Chevron product relates to high impact polystyrene (HIPS) with ESCR properties and not to a rubber modified styrene/maleic anhydride copolymer.

A number of process designs are disclosed in the patent literature involving polymerization techniques, reactor configurations and mixing schemes that are used to incorporate maleic anhydride in a styrene/maleic anhydride copolymer. Examples include Tanaka et al. U.S. Pat. No. 4,328,327 assigned to Daicel Chemical Industries, Ltd., Meyer et al. U.S. Pat. No. 4,921,906 assigned to Stamicarbon B. V., and the above Moore et al. U.S. Pat. No. 3,919,354 assigned to The Dow Chemical Company.

The latter document, i.e. U.S. Pat. No. 3,919,354 discloses an improved styrene/maleic anhydride/diene rubber composition suitable for extrusion and molding and having a high heat distortion temperature and desired impact resistance. The process for the preparation of the polymer involves modifying a styrene-maleic anhydride copolymer with diene rubber by polymerizing the styrene monomer and the anhydride in the presence of the rubber. More particularly, the process involves providing a styrene having rubber dissolved therein; agitating the styrene/rubber mixture and initiating free radical polymerization thereof; adding to the agitated mixture the maleic anhydride at a rate substantially less than the rate of polymerization of the styrene monomer; and polymerizing the styrene monomer and the maleic anhydride. The polymer contains rubber particles ranging from 0.02 to 30 microns dispersed throughout a matrix of polymer of the styrene monomer and the anhydride with at least a major portion of the rubber particles containing occlusions of the polymerized styrene monomer and maleic anhydride. This patent teaches that the polymers are suited for extrusion into sheet or film, which are then employed for thermoforming into containers, packages and the like. Alternately the polymers can be injection molded into a wide variety of components such as dinnerware and heatable frozen food containers.

However, polymers as those disclosed in the above U.S. Pat. No. 3,919,354 are generally brittle, and therefore, capable of breaking even though these polymers have the thermal properties to withstand temperatures above 210° F., which temperature is generally used in heating food in a microwave oven.

It is desirable to have an article such as a container that is suitable for packaged foods and that could withstand the temperatures needed for heating foods in a microwave oven without the container breaking, especially upon removal of the container out of the microwave oven.

SUMMARY OF THE INVENTION

The invention has met this need in the food packaging industry. It has been found by the inventors that a rubber modified styrene/maleic anhydride (SMA) copolymer with polybutene can produce a styrenic resin composition that is particularly useful for thermoforming articles, i.e. especially food containers for use in heating foods in microwave ovens, and which styrenic resin composition has excellent heat resistance properties as well as excellent toughness and elongation properties.

The styrenic resin composition of the invention comprises a rubber modified styrene/maleic anhydride copolymer and a polybutene, the latter of which enhances the rubber modified styrene/maleic anhydride copolymer. Of this composition, the weight percent of polybutene ranges from about 0.1% to about 8%; preferably from about 2% to about 6% by weight; and more preferably from about 3 to about 5% by weight. The weight percent of the rubber modified styrene/maleic anhydride copolymer ranges from about 92.0% to about 99.9%; preferably from about 94.0% to about 98%; and more preferably from about 95% to about 97%. The maleic anhydride content of the rubber modified styrene/maleic anhydride copolymer generally will range from about 2% to about 25% by weight, and preferably from about 5% to about 15% by weight. The styrene content of the rubber modified styrene/maleic anhydride copolymer ranges from about 75% to about 98% by weight, and preferably from about 85% to about 95% by weight. The rubber content of the rubber modified styrene/maleic anhydride copolymer will range from about 4% to about 20% by weight, and preferably from about 8% to about 15% by weight, and the rubber particle size generally will range from about 0.1 micron to about 11 microns.

The styrenic resin composition can be prepared by polymerizing rubber, styrene monomers, and maleic anhydride in the presence of polybutene in a suitable reactor under free radical polymerization conditions. The polybutene can be added to the rubber/styrene/maleic anhydride feed, or can be added to or in the polymerization reactor vessel, or can be added to the partially polymerized syrup after it exits the reactor and enters the devolatilizer. It is also envisioned that the polybutene can be compounded, i.e. mixed into the polymer after the polymer has exited the devolatilizer, via an extruder, e.g. a twin-screw extruder, either in line or off line as a separate operation after the rubber modified SMA copolymer has been pelletized.

The invention also provides for an extruded thermoplastic sheet made from the styrenic resin composition of the invention, as well as thermoformed articles made from the sheet. An example of an article is a container for packaged foods that is to be heated particularly in a microwave oven and which article has improved toughness, elongation, and heat distortion resistance properties.

Furthermore, there is provided a multi-layer thermoplastic composite comprising a substrate layer and a layer made from the styrenic resin composition of the invention, which multi-layer composite can be thermoformed into articles, e.g. containers suitable for heating purposes in microwave ovens, and which articles have improved toughness, elongation, and heat distortion resistance properties.

These and other objects of the present invention will be better appreciated and understood by those skilled in the art from the following description and appended claims.

DETAILED DESCRIPTION OF THE INVENTION

The styrenic resin composition of the invention comprises a rubber modified styrene maleic anhydride copolymer and polybutene. More particularly, the styrenic resin composition is comprised of at least rubber, styrene, maleic anhydride, and polybutene.

The term "devolatilizer" and the term "devolatilizing system" as used herein are meant to include all shapes and forms of devolatilizers including an extruder and/or a falling strand flash devolatilizer. The term "devolatilizing" and the term "devolatilizing step" as used herein are meant to refer to a process, which may include an extruder and/or a falling strand flash devolatilizer.

In an embodiment of the invention, the inventors have found that a low molecular weight polybutene can be added to the reacting mixture of rubber, styrene, and maleic anhydride before the devolatilization step to improve toughness, elongation, and heat distortion resistance properties of a styrenic resin composition. This resin composition can be used in applications where the prior art resins proved to be too brittle and/or the heat distortion resistance was inadequate. For example, and as discussed hereinabove, if containers for packaged foods made from the rubber modified styrenic/maleic anhydride resins of the prior art are heated in microwave ovens at temperatures higher than 210° F., the containers generally break when they are taken out of the oven. The resin of the invention can now be used in making these types of containers without the containers breaking under normal usage.

The reason for the improvements in the styrenic resin composition of the invention is not clear, and the inventors do not wish to be bound to any theory. However, it is believed that the addition of polybutene to the components of the rubber modified styrene/maleic anhydride copolymer particularly before devolatilizing distributes the polybutene such that it enhances the properties of the rubber component. That is, it is believed that the polybutene gravitates toward and surrounds the rubber component and not the styrene/maleic anydride component in view of the high polarity of the styrene/maleic anhydride matrix. In contrast, the inventors theorize that the polybutene used particularly in accordance with the teachings of U.S. Pat. No. 5,543,461 is distributed in the matrix along with the polystyrene and the rubber component.

U.S. Pat. No. 5,543,461 teaches that the rubber modified thermoplastic composition can be rubber modified styrene/maleic anhydride copolymer and polybutene. However, the Examples of this '461 patent only illustrate high impact polystyrene (HIPS) and improvements in ESCR, and both the Examples and the teachings of this '461 patent are silent on any enhancement in toughness.

This U.S. Pat. No. 5,543,461 teaches that the polybutene ranges in amounts from 1 to 4% by weight and the rubber particle size ranges from 6 to 12 microns. The inventors have found that the rubber particle size used in the styrenic resin composition of the invention can be less than 6 microns without affecting the much sought-after improvements in properties. This is illustrated in the Examples, particularly in Examples 1 and 2 herein, where a particle size smaller than 6 microns still results in improved toughness and elongation.

The styrenic resin composition of the invention may be prepared via polymerization techniques or compounding techniques, both of which are known to those skilled in the art.

It has been found by the inventors that the addition of the polybutene to the reactor or to the syrup exiting the reactor and prior to it entering the devolatilizer may provide even a higher degree of improvement in toughness, elongation, and heat distortion resistance properties compared to the addition of the polybutene in a compounding technique which entails the polybutene being added to the polymer in an extruder after the devolatilizer and the pelletizer or after the devolatilizer but before the pelletizer, more about which will be discussed herein below.

The polymerization techniques used in polymerizing the components of the styrenic resin composition of the invention may be solution, mass, bulk, suspension, or emulsion polymerization. Bulk polymerization is preferred.

The styrenic resin composition may be prepared by reacting styrene monomers, maleic anhydride, and rubber in a suitable reactor under free radical polymerization conditions and adding the polybutene to the reactive mixture. Desirably the maleic anhydride is added to the styrene monomers and the rubber continuously at about the rate of reaction to a stirred reactor to form a polymer composition having a uniform maleic anhydride.

The amount of styrene monomers added to the reactor ranges from about 80% to about 95% by weight; the amount of maleic anhydride added to the reactor ranges from about 5% to about 20% by weight; the amount of rubber added to the reactor ranges from about 4% to about 15% by weight; and the amount of polybutene added to the reactor ranges from about 0.5% to about 8.0% by weight, based on the weight of the total weight of the components of the styrenic resin composition.

The formed styrenic resin composition comprises a rubber modified styrene/maleic anhydride copolymer and polybutene. Of this styrenic resin composition the rubber modified styrene/maleic anhydride copolymer ranges from about 99.9% to about 92.0% by weight and the polybutene ranges from about 0.1% to about 8%. Preferably, the polybutene ranges from about 2% to about 6% by weight, and most preferably, from about 3% to about 5% by weight.

Of the rubber modified styrene/maleic anhydride copolymer, the maleic anhydride content generally ranges from about 2% to about 25% by weight, and preferably, from about 5% to about 15% by weight; the rubber content generally ranges from about 4% to about 20% by weight, and preferably from about 8% to about 15% by weight, with the remaining amount being styrene.

The polybutene may have a number average molecular weight (Mn) from about 900 to about 2500, preferably from about 900 to about 1300. The polybutene is added to the other components of the styrenic resin composition of the invention in the manner taught herein.

Suitable rubbers for the styrenic resin composition are ethylene-propylene copolymers, ethylene propylene copolymers in which other polyunsaturated monomers have been copolymerized, polybutadiene, butadiene, styrene-butadiene rubber, butadiene-acrylonitrile rubber, polychloroprene, acrylate rubber, chlorinated polyethylene rubber, polyisoprene and cyclo-olefin rubbers. The rubber particles may have a particle size such that the volume average particle size diameter of the particles is about 0.1 micron to about 11 microns. The rubber particle size may be less than 6 microns, that is, ranging from 0.1 micron to about 5 microns, and still result in the desired properties of the styrenic resin composition.

A preferred rubber is polybutadiene. The polybutadiene rubber may be medium or high cis-polybutadiene. Typically, high cis-polybutadiene contains not less than 95%, preferably more than about 98 weight % of the polymer in the cis-configuration. Typically, medium cis-polybutadiene has a cis content from about 60 to 80, and preferably from about 65 to 75 weight %. Examples of a suitable high cis-polybutadiene include Taktene 1202 made by Bayer Corporation and Nipol 1220SU and Nipol 1220SG available from Nippon Zeon Co., Limited. Examples of a suitable medium cis-polybutadiene include Diene 55 and Diene 70 available from Firestone Polymers, and Asadene 55AE available from Asahi Kasei Corporation.

The addition of the polybutene to the styrene monomer, the rubber, and the maleic anhydride is preferably brought about through a polymerization process. In the polymerization process, the polybutene is added in solution with the feedstock in the reactor, or is added to the reactor separately from the other components, or is added to the partially polymerized syrup after the syrup exits the reactor and prior to the syrup entering the devolatilizer. The polybutene can also be incorporated into the styrenic composition through compounding techniques.

Polymerization of the polymerizable mixture may be accomplished by thermal polymerization generally between 50° C. and 200° C.; preferably, between 70° C. and 150° C.; and most preferably between 80° C. and 140° C. Alternately free-radical generating initiators may be used.

Examples of free-radical initiators that may be used are benzoyl peroxide, 2,4-dichlorobenzoyl peroxide, di-tert-butyl peroxide, tert-butyl peroxybenzoate, dicumyl peroxide, cumene hydroperoxide, diisopropylbenzene hydroperoxide, diisopropyl peroxydicarbonate, tert-butyl perisobutyrate, tert-butyl peroxyisopropylcarbonate, tert-butyl peroxypivalate, methyl ethyl ketone peroxide, stearoyl peroxide, tert-butyl hyroperoxide, lauroyl peroxide, azo-bis-isobutyronitrile or mixtures thereof.

Generally, the initiator is included in the range of 0.001 to 1.0% by weight, and preferably on the order of 0.005 to 0.5% by weight of the polymerizable material, depending upon the monomers and the desired polymerization cycle.

Preferably, the required total amount of initiator is added simultaneously with the feedstock when the feedstock is introduced into the reactor.

The customary additives, such as stabilizers, antioxidants, lubricants, fillers, pigments, plasticizers, etc., may be added to the polymerization mixture. If desired, small amounts of antioxidants, such as alkylated phenols, e.g., 2,6-di-tert-butyl-p-cresol, phosphates such as trinonyl phenyl phosphite and mixtures containing tri (mono and dinonyl phenyl) phosphates, may be included in the feed stream. Such materials, in general, may be added at any stage during the polymerization process.

A polymerization reactor that can be used in producing the styrenic resin composition of the invention is similar to that disclosed in the aforesaid U.S. Pat. Nos. 2,769,804 and 2,989,517, the teachings of which patents are incorporated in their entirety herein by reference. These configurations are adapted for the production, in a continuous manner, of solid, moldable polymers and copolymers of vinylidene compounds, particularly that of monovinyl aromatic compounds, i.e. styrene. Of these two arrangements, that of U.S. Pat. No. 2,769,804 is particularly preferred.

In general, the arrangement of U.S. Pat. No. 2,769,804 provides for an inlet or inlets for the monomers or feedstock connected to the polymerization reactor vessel. The reactor vessel is surrounded by a jacket, which has an inlet and an outlet for passage of a temperature control fluid through the vessel, and a mechanical stirrer. A valve line leads from a lower section of the vessel and connects with a devolatilizer, which may be any of the devices known in the art for the continuous vaporization and removal of volatile components from the formed resin exiting the vessel. For example, the devolatilizer may be a vacuum chamber through which thin streams of heated resin material pass, or a set of rolls for milling the heated polymer inside of a vacuum chamber, etc. The devolatilizer is provided with usual means such as a gear pump for discharging the residual heat-plastified polymer from the devolatilizer through the outlet of the reactor vessel. A vapor line leads from the devolatilizer to a pump, which serves to compress the vapors and cause return of the recovered volatiles, e.g. monomeric material, preferably in liquid condition through a line which leads from the pump and connects with an inlet line to the reactor vessel.

In general, the arrangement for producing the styrenic resin composition will be comprised of at least three apparatuses. These are a polymerization reactor vessel assembly that may consist of one or more reactor vessels, a devolatilizing system, and a pelletizer. As discussed hereinabove, in some preferred processes of the invention, the polybutene is added to the polymer at one of three locations, i.e. to the reactor vessel; after the reactor vessel and prior to the devolatilizing system; or in a pelletizing extruder wherein compounding or mixing of the polybutene into the polymer occurs.

More particularly, a first method for preparing the styrenic resin composition of the invention is to prepare a solution of the components, i.e. the polybutene, maleic anhydride, rubber, and optionally an antioxidant and to dissolve this solution in styrene monomer which then is fed continuously to a polymerization reactor vessel that is equipped with a turbine agitator similar to that described in the preceding paragraph. The initiator may be added to the reactor vessel in a second stream. The reactor is stirred so that the contents are well mix and the temperature is maintained by the cooling fluid flowing in the reactor jacket. The exit stream is continuously fed into the devolatilizer (first extruder), and the final product is pelletized.

A second method involves adding the polybutene and the styrene maleic anhydride rubber feed separately to the polymerization reactor vessel and then polymerizing the feed in the presence of the polybutene and the rubber followed by devolatilizing the stream that exits the reactor vessel. The finished product may be pelletized after the devolatilizing system.

A third method involves forming a solution of maleic anhydride and rubber in styrene monomer, continuously feeding this solution with the styrene monomer into the polymerization reactor vessel to produce a partially polymerized styrenic syrup, and adding the polybutene to the partially polymerized syrup as it exits the reactor vessel and prior to this syrup entering the devolatilizing system. The finished product may be pelletized after the devolatilizing system.

A fourth method involves forming a solution of maleic anhydride and rubber in styrene monomer, continuously feeding the solution with the styrene monomer into a polymerization reactor vessel to produce a partially polymerized styrenic syrup, devolatilizing the stream exiting the polymerization reactor vessel, and compounding or mixing the polybutene into the polymer stream either in an in-line extruder followed by pelletizing or in a separate extrusion step after the rubber modified styrene maleic anhydride (SMA) copolymer has been pelletized.

The polymerization generally occurs at a conversion of from 20 to 95%.

The styrenic resin composition is suitable for extrusion into sheet or film. The sheet is beneficially employed for thermoforming into food containers especially those which are heatable in microwave ovens.

The following examples are intended to assist in understanding the present invention, however, in no way should these examples be interpreted as limiting the scope thereof.

In the Examples, the formed resins were injection molded into test specimens, which were tested by the following methods. The elongation at break was measured by ASTM-D638; the IZOD notched impact was measured by ASTM-D256; the VICAT heat distortion temperature was measured by ASTM-D1525; the Deflection Temperature Under Load (DTUL) was measured by ASTM-D648 on specimens annealed at 70° C. with 264 psi flexural stress; and the Instrumented Impact was measured by ASTM D-3763 with a 38 mm diameter hole clamp. The results are tabulated in the Tables below.

EXAMPLES

The Examples illustrate styrenic resins formed by adding polybutene to the reactive mixture in a polymerization reactor. Polybutene H100 has a number average molecular weight of 910. Polybutene H300 has a number average molecular weight of 1300. Both Polybutene H100 and Polybutene H300 are products of BP-Amoco. The comparative examples, Comparative A, B, C, and D, do not contain polybutene.

Example 1

A solution containing 4.2% maleic anhydride, 1.6% polybutene H100 (BP-Amoco), 7.5% butadiene rubber, and 0.16% antioxidant (ANOX PP18, which is octadecycyl-3-(3',5'-di-tert-butyl-4'-hydroxyphenyl)propionate (obtained through Great Lakes Chemical Corp.) was dissolved in styrene monomer, and then fed continuously to a completely filled polymerization reactor equipped with a turbine agitator similar to that of U.S. Pat. No. 2,769,804. Benzoyl peroxide initiator, 0.01% of the main stream, was added into the reactor in a separate stream. The reactor was stirred so that it was well mixed. The reacting mass was maintained at 126° C. by cooling through the reactor jacket. The average residence time in the reactor was 2.7 hours. The exit stream contained 52% polymer and was then fed continuously into a devolatilizer in which the unreacted monomer was removed. The resultant resin contained 8% maleic anhydride, 15% butadiene rubber and 2.5% polybutene. Some of the polybutene was removed in the devolatilizing process. The final product was pelletized and molded into test specimens and testing was done using the methods outlined hereinabove.

The physical properties for the test specimens for Comparative A and Example 1 appear in Table 1. Comparative A specimen was produced in a process similar to that for Example 1 except polybutene was not incorporated therein.

TABLE 1

|  | Comparative A | Example 1 |
|---|---|---|
| MA Content (%) | 8.3 | 8.3 |
| Rubber Content (%) | 14.6 | 14.2 |
| Polybutene H-100 (%) | 0 | 2.5 |
| Rubber Particle Size (Micron) | 6.2 | 4.4 |
| DTUL (° C.) | 101 | 100 |
| IZOD (ft. lbs./in.) | 2.45 | 3.54 |
| Stress @ Yield (ksi) | 3.80 | 3.83 |
| Strain @ Break (%) | 33.56 | 39.47 |
| Flex Modulus (ksi) | 342.60 | 338.38 |
| Instrumented Impact |  |  |
| Maximum Load (lb.) | 229.43 | 251.05 |
| Energy to Max. Load (ft./lb.) | 3.40 | 4.81 |
| Total Energy (ft-lb) | 5.63 | 7.23 |

The presence of polybutene improved the overall balance of properties. For example, toughness was improved as indicated by IZOD, strain at break, and instrumented impact properties without any negative impact on tensile strength and flex modulus.

Example 2

The procedure of Example 1 was repeated except that 2% polybutene H100 (BP-Amoco) was used in the initial solution and two reactors in series were used in the polymerization. The physical properties for the test specimen obtained in Example 2 are shown in Table 2 and are compared to Comparative B specimen. Comparative B specimen was formed in a manner similar to that used to form Example 2 except that polybutene was not added to the reaction process.

TABLE 2

|  | Comparative B | Example 2 |
|---|---|---|
| MA Content (%) | 6.4 | 6.6 |
| Rubber Content (%) | 13.9 | 13.5 |
| Polybutene (%) (nominal) | 0 | 2 |
| Rubber Particle Size (micron) | 5.3 | 5.0 |
| FR (g/10 min) | 0.88 | 0.91 |
| DTUL (° C.) | 88.8 | 88.7 |
| IZOD (ft.-lbs/in.) | 1.81 | 2.00 |
| Strain @ Break (%) | 17.87 | 27.62 |
| Stress @ Yield (ksi) | 3.73 | 3.59 |

TABLE 2-continued

|  | Comparative B | Example 2 |
|---|---|---|
| Toughness (lb. ft./in$^3$) | 699.64 | 1035.41 |
| Young's Modulus (ksi) | 288.99 | 288.58 |

The results illustrate that the toughness and elongation properties of the resin of Example 2, which contains polybutene improved when compared to the Comparative B specimen, which does not contain polybutene.

Example 3

The procedure of Example 2 was repeated except that 3% polybutene H100 (BP-Amoco) was used in the initial solution and all the maleic anhydride was added to the first reactor. The final resin contained 3% polybutene. The physical properties for the Example 3 specimen are shown in Table 3 and are compared to Comparative C specimen. Comparative C specimen was formed in a process similar to that used to produce Example 3, except that polybutene was not added to the reaction process.

TABLE 3

|  | Comparative C | Example 3 |
|---|---|---|
| MA Content (%) | 12.9 | 12.5 |
| Rubber Content (%) | 5.7 | 5.4 |
| Polybutene (%) (nominal) | 0 | 3 |
| Rubber Particle Size (micron) | 8.8 | 10.1 |
| FR (g/10 min) | 0.82 | 0.81 |
| DTUL (° C.) | 87.1 | 86 |
| IZOD (ft-lbs./in) | 1.14 | 1.11 |
| Strain @ Break (%) | 10.70 | 17.22 |
| Stress @ Yield (ksi) | 3.98 | 3.48 |
| Toughness (lb. ft./in$^3$) | 429.03 | 650.20 |
| Young's Modulus (ksi) | 285.89 | 269.49 |

The results illustrate that the toughness and elongation properties of the resin of Example 3, which contain polybutene were improved when compared to those for Comparative C which does not contain polybutene.

Examples 4-9

The procedure for Example 2 was repeated using the parameters appearing in Table 4. The results also appear in Table 4. Comparative D specimen was formed in a process similar to that used to form Example 2 except that polybutene was not added.

TABLE 4

|  | Comparative D | Sample 4 | Sample 5 | Sample 6 | Sample 7 | Sample 8 | Sample 9 |
|---|---|---|---|---|---|---|---|
| Polybutene Type |  | Polybutene H-100 |  |  | Polybutene H-300 |  |  |
| PB (%) | 0 | 1.79 | 3.82 | 6.42 | 2.46 | 2.54 | 4.31 |
| MA (%) | 7.5 | 7.9 | 7.8 | 7.3 | 7.8 | 7.6 | 7.8 |
| Rubber (%) | 15.8 | 16 | 15.7 | 14.7 | 15.4 | 15.4 | 15.4 |
| Rubber Particle Size (micron) | 5.8 | 5.0 | 4.0 | 4.2 | 4.7 | 4.8 | 5.1 |

TABLE 4-continued

|  | Comparative D | Sample 4 | Sample 5 | Sample 6 | Sample 7 | Sample 8 | Sample 9 |
|---|---|---|---|---|---|---|---|
| IZOD (ft. lbs./in.) | 1.48 | 1.24 | 1.48 | 1.37 | 1.57 | 1.63 | 1.72 |
| Tensile Strain at Break (%) | 10.34 | 14.6 | 16.3 | 15.3 | 12.8 | 14.9 | 19.2 |
| Tensile Stress at Yield (ksi) | 3.42 | 3.37 | 3.50 | 3.43 | 3.44 | 3.39 | 3.34 |
| Toughness (lb. ft./in$^3$) | 308.94 | 338.66 | 489.56 | 385.16 | 423.26 | 546.03 | 616.38 |
| Young's Modulus (ksi) | 270.69 | 277.08 | 292.74 | 272.97 | 279.31 | 284.71 | 285.52 |

Examples 4-9 illustrate that both Polybutene H-100 and Polybutene H-300 result in improved properties. Polybutene improved the overall balance of properties. In general, the toughness was improved without any negative impact on tensile strength and the Young's modulus.

Examples 1-9 show that polybutene improves the physical properties of the rubber modified styrenic/maleic anhydride copolymer and that this improvement is not necessarily a function of the rubber particle size. That is, a rubber particle size of 4.4 microns in Example 1, a rubber particle size of 5.0 microns in Example 2 and a rubber particle size of 10.1 microns in Example 3 all result in improved toughness and elongation properties of the resin.

While the present invention has been particularly set forth in terms of specific embodiments thereof, it will be understood in view of the instant disclosure that numerous variations upon the invention are now enabled yet reside within the scope of the invention. Accordingly, the invention is to be broadly construed and limited only by the scope and spirit of the claims now appended hereto.

What is claimed is:

1. A method for preparing a rubber modified styrenic resin composition with at least improved toughness properties, consisting of from about 92.0% to about 99.9% by weight of a rubber modified styrene maleic anhydride copolymer, from about 0.1% to about 8.0% by weight of polybutene based on the weight of the rubber modified styrenic resin composition, and optionally, customary additives including stabilizers, antioxidants, lubricants, fillers, pigments, and/or plasticizers; and wherein said rubber modified styrenic resin composition is produced in a polymerization process and said polybutene is part of the reactive mixture of said styrene, said maleic anhydride and said rubber in said polymerization process, the steps comprising:

in said polymerization process, adding the polybutene to partially polymerized syrup comprised of rubber, styrene, and maleic anhydride after the syrup exits a reactor and enters a devolatilizer.

2. The method for preparing a rubber modified sytrenic resin composition of claim 1 wherein the amount of said polybutene ranges from about 2 to about 6 weight percent based on the weight of the rubber modified styrenic resin composition.

3. The method for preparing a rubber modified styrenic resin composition of claim 1 wherein said polybutene has a number average molecular weight ranging from about 900 to about 2500.

4. The method for preparing a rubber modified styrenic resin composition of claim 1 wherein said rubber modified styrene maleic anhydride copolymer is comprised of from about 2% to about 25% by weight of maleic anhydride and from about 4% to about 20% by weight of rubber based on the weight of said rubber modified styrene maleic anhydride copolymer, and wherein the particle size of the rubber ranges from about 0.1 micron to about 11 microns.

5. The method for preparing a rubber modified styrenic resin composition of claim 4 wherein said rubber is polybutadiene.

6. A method for preparing a rubber modified styrenic resin composition with at least improved toughness properties, consisting of from about 92.0% to about 99.9% by weight of a rubber modified styrene maleic anhydride copolymer, from about 0.1% to about 8.0% by weight of polybutene based on the weight of the rubber modified styrenic resin composition, and optionally, customary additives including stabilizers, antioxidants, lubricants, fillers, pigments, and/or plasticizers; and wherein said rubber modified styrenic resin composition is produced in a polymerization process and said polybutene is part of the reactive mixture of said styrene, said maleic anhydride and said rubber in said polymerization process, the steps comprising:

for the polymerization process, forming a solution of the polybutene, maleic anhydride, and rubber by dissolving the polybutene, the maleic anhydride and the rubber in styrene monomer, continuously feeding the solution with said styrene monomer into a polymerization reactor vessel, and devolatilizing the stream exiting the polymerization reactor vessel thereby producing the rubber modified styrenic resin composition.

7. The method for preparing a rubber modified sytrenic resin composition of claim 6 wherein the amount of said polybutene ranges from about 2 to about 6 weight percent based on the weight of the rubber modified styrenic resin composition.

8. The method for preparing a rubber modified styrenic resin composition of claim 6 wherein said polybutene has a number average molecular weight ranging from about 900 to about 2500.

9. The method for preparing a rubber modified styrenic resin composition of claim 6 wherein said rubber modified styrene maleic anhydride copolymer is comprised of from about 2% to about 25% by weight of maleic anhydride and from about 4% to about 20% by weight of rubber based on the weight of said rubber modified styrene maleic anhydride copolymer, and wherein the particle size of the rubber ranges from about 0.1 micron to about 11 microns.

10. The method for preparing a rubber modified styrenic resin composition of claim 9 wherein said rubber is polybutadiene.

11. A method for preparing a rubber modified styrenic resin composition with at least improved toughness properties, consisting of from about 92.0% to about 99.9% by weight of a rubber modified styrene maleic anhydride copolymer, from about 0.1% to about 8.0% by weight of polybutene based on the weight of the rubber modified styrenic resin composition, and optionally, customary additives including stabilizers, antioxidants, lubricants, fillers, pigments, and/or plasticizers; and wherein said rubber modified styrenic resin composition is produced in a polymerization process and said polybutene is part of the reactive mixture of said styrene, said maleic anhydride and said rubber in said polymerization process, the steps comprising:

for the polymerization process, adding polybutene and styrene maleic anhydride rubber feed separately into a polymerization reactor vessel, polymerizing the styrene maleic anhydride feed in the presence of the polybutene and the rubber in the polymerization reactor vessel, and devolatilizing the stream exiting the polymerization reactor vessel thereby producing said rubber modified styrenic resin composition.

12. The method for preparing a rubber modified sytrenic resin composition of claim 11 wherein the amount of said polybutene ranges from about 2 to about 6 weight percent based on the weight of the rubber modified styrenic resin composition.

13. The method for preparing a rubber modified styrenic resin composition of claim 11 wherein said polybutene has a number average molecular weight ranging from about 900 to about 2500.

14. The method for preparing a rubber modified styrenic resin composition of claim 11 wherein said rubber modified styrene maleic anhydride copolymer is comprised of from about 2% to about 25% by weight of maleic anhydride and from about 4% to about 20% by weight of rubber based on the weight of said rubber modified styrene maleic anhydride copolymer, and wherein the particle size of the rubber ranges from about 0.1 micron to about 11 microns.

15. The method for preparing a rubber modified styrenic resin composition of claim 14 wherein said rubber is polybutadiene.

16. A method for preparing a rubber modified styrenic resin composition with at least improved toughness properties, consisting of from about 92.0% to about 99.9% by weight of a rubber modified styrene maleic anhydride copolymer, from about 0.1% to about 8.0% by weight of polybutene based on the weight of the rubber modified styrenic resin composition, and optionally, customary additives including stabilizers, antioxidants, lubricants, fillers, pigments, and/or plasticizers; and wherein said rubber modified styrenic resin composition is produced in a polymerization process and said polybutene is part of the reactive mixture of said styrene, said maleic anhydride and said rubber in said polymerization process, the steps comprising:

for the polymerization process, forming a solution of maleic anhydride and rubber in styrene monomer, continuously feeding said solution with said styrene monomer into a polymerization reactor vessel to produce a partially polymerized styrenic syrup, adding the polybutene to said partially polymerized styrenic syrup after it exits the reactor vessel and devolatilizing the stream after the polybutene has been added to the partially polymerized styrenic syrup thereby producing the rubber modified styrenic resin composition.

17. The method for preparing a rubber modified sytrenic resin composition of claim 16 wherein the amount of said polybutene ranges from about 2 to about 6 weight percent based on the weight of the rubber modified styrenic resin composition.

18. The method for preparing a rubber modified styrenic resin composition of claim 16 wherein said polybutene has a number average molecular weight ranging from about 900 to about 2500.

19. The method for preparing a rubber modified styrenic resin composition of claim 16 wherein said rubber modified styrene maleic anhydride copolymer is comprised of from about 2% to about 25% by weight of maleic anhydride and from about 4% to about 20% by weight of rubber based on the weight of said rubber modified styrene maleic anhydride copolymer, and wherein the particle size of the rubber ranges from about 0.1 micron to about 11 microns.

20. The method for preparing a rubber modified styrenic resin composition of claim 19 wherein said rubber is polybutadiene.

* * * * *